United States Patent Office 2,975,222
Patented Mar. 14, 1961

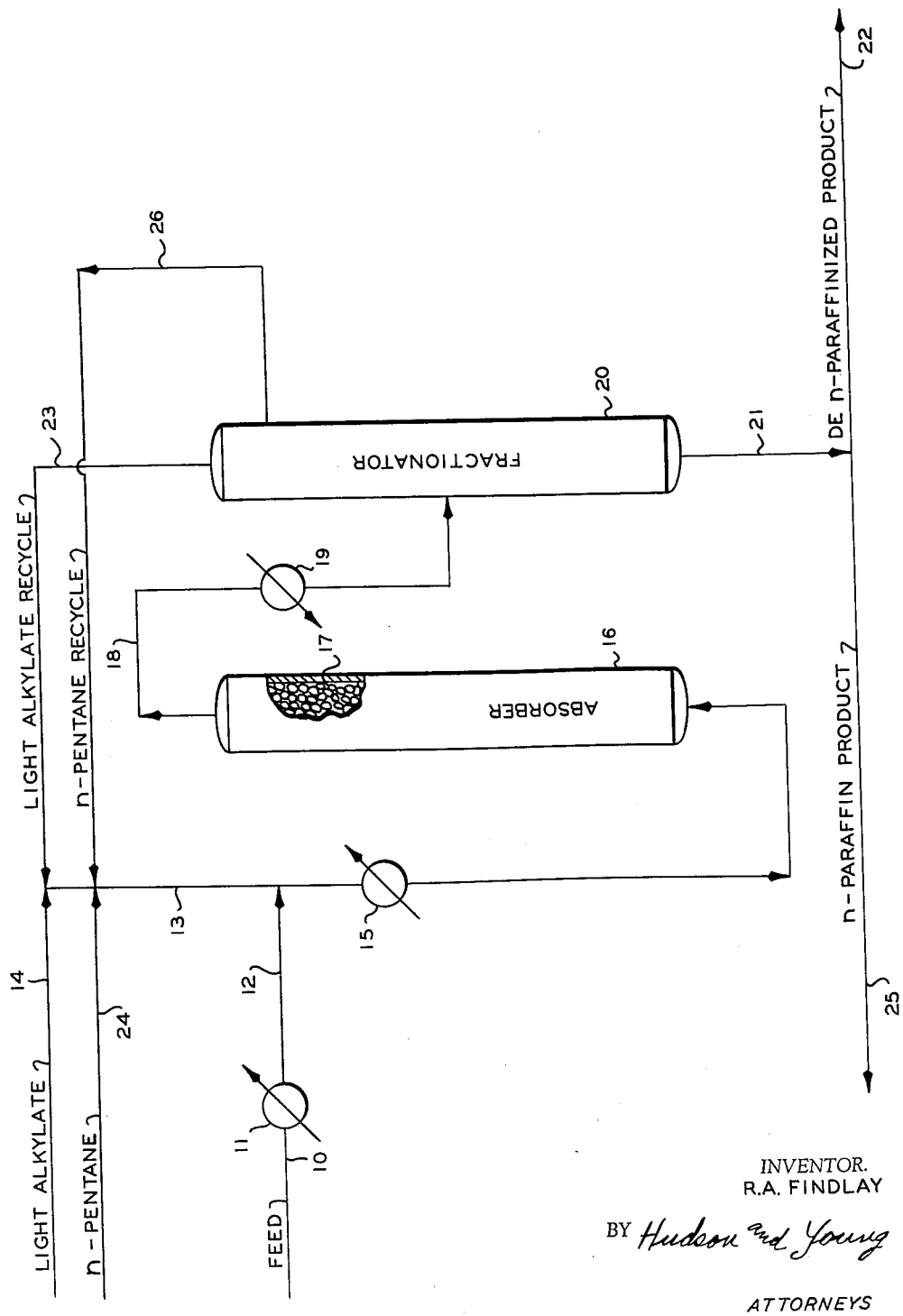

2,975,222

DILUTION OF HIGH BOILING FEED IN ZEOLITIC MOLECULAR SIEVE

Robert A. Findlay, Bartlesville, Okla., assignor to Phillips Petroleum Company, a corporation of Delaware Filed Aug. 15, 1957, Ser. No. 678,311

13 Claims. (Cl. 260—676)

This invention relates to the separation of hydrocarbons. In one of its aspects, this invention relates to an improved method for the use of inorganic absorbents for effecting the separation of hydrocarbons.

It is known that certain synthetic and natural zeolites have the ability of separating organic materials, e.g., hydrocarbons, in accordance with their molecular structure. The materials which are capable of making this separation are referred to as "molecular sieves" and include materials, such as chabasite, magnesium alumino silicates and zinc alumino silicates. These materials have a pore size of approximately 5 Angstroms so that molecules of a critical diameter larger than the pore size of these materials are not adsorbed by the materials while the molecules having a critical molecular diameter smaller than the pore size of these materials are selectively adsorbed by the materials.

These adsorbents, hereinafter referred to as "molecular sieves" have been found to display some catalytic activity with respect to hydrocarbons at elevated temperatures, in addition to their adsorptive characteristics. At temperatures in excess of about 550° F. it has been found that decomposition of hydrocarbons, in contact with the molecular sieve, begins to occur and the molecular sieve becomes contaminated with carbon so that the sieve loses its adsorptive power to a great extent. At these elevated temperatures, e.g., 550 to 600° F., and higher, the structure of the sieve appears to be affected also, thereby further decreasing the adsorptive power of the sieve. It has heretofore been considered that selective adsorption of high molecular weight n-paraffins could not be attained because of the length of the n-paraffin chain because it was not recognized that failure to attain a separation was due to a temperature effect.

The present invention is based upon the discovery that a molecular sieve will satisfactorily separate hydrocarbons of different molecular configuration having dew points above the temperature at which these hydrocarbons tend to decompose in the presence of the molecular sieve and that the separation can successfully be accomplished by admixing with these heavier hydrocarbon fractions a sufficient amount of a low boiling hydrocarbon to permit vaporization of the resulting mixture at a temperature below the decomposition temperature of the high boiling hydrocarbons in the presence of a molecular sieve.

It is therefore an object of this invention to provide a method for utilizing a molecular sieve for the separation of high boiling hydrocarbons. It is also an object of this invention to provide a method for operating a molecular sieve in the vapor phase and at a temperature below the dew point temperature of the hydrocarbons in contact with the molecular sieve. A further object of the invention is the provision of a means for carrying out the above stated objects. Other and further objects will be apparent to one skilled in the art from a consideration of the accompanying disclosure.

I have discovered that substantially all of the straight chain components can be removed from a mixture of organic compounds containing both straight chain and branched chain compounds and having dew points above about 550° F. by adsorption on a molecular sieve by admixing with said organic compounds a low boiling, highly branched organic compound so that the dew point of the resulting mixture is less than the temperature at which the material is decomposed in contact with a molecular sieve and then contacting the vaporized compounds with a molecular sieve. By the practice of this invention, a high boiling feed stock, such as kerosene, boiling in the range of 450° to 525° F. is charged to an adsorption zone containing a molecular sieve along with a relatively low boiling, highly branched chain hydrocarbon, such as 2,2,4-trimethylpentane, whereby the total vapor pressure of the mixture is increased. It would be necessary to operate the process at about 600° F. without addition of the low boiling material. By addition of the lower boiling material in a ratio of, for example 1:1, it has been found that operating temperatures of 475° F. are suitable for carrying out the operation in the vapor phase. Likewise, when using a 2:1 ratio of the stated materials, it is possible to operate at a temperature of about 445° F. At these temperatures, the molecular sieves will substantially remove the normal paraffins from the feed stocks and will not suffer detrimental effects. It will be noted that the lower boiling carrier gas is advantageously a highly branched material, the reason being that the highly branched material will not be adsorbed on the molecular sieves to the detriment of adsorption of the heavy normal hydrocarbons. After the feed stock, plus the carrier gas, has passed through the sieve, the effluent passes to a small column wherein the low boiling material is removed overhead and is recycled to the process and the heavier material, being substantially free of normal paraffins, is available for its intended use. When the molecular sieve has reached its capacity, as evidenced by the appearance of normal paraffins in the effluent, it is necessary to displace the adsorbed material, essentially 100 percent normal paraffins from the sieve. This can be accomplished by an increase in temperature, a decrease in pressure, or by displacement with another, and preferably lower molecular weight normal paraffin, such as normal pentane or normal butane.

Upon removal of the adsorbed material, the molecular sieve is again ready for another charge.

The invention has particular utility in removal of n-paraffins from kerosene to meet freezing point specifications in jet fuels, and also in the preparation of high purity n-paraffins having high boiling points. The desired degree of straight chain component removal can be attained by control of operating variable such as temperature, space velocity, etc. In a commercial operation an economic compromise is usually necessary. The amount of low boiling, non-straight chain component will usually be the minimum amount required to lower the dew point temperature of the resulting mixture to below about 550° F. at the operating pressure. The adsorption of straight chain compounds by the molecular sieve is, for all practical purposes, independent of pressure; therefore, low pressure will ordinarily be utilized in order to lower the dew point temperature.

The drawing is a diagrammatic flow sheet of one embodiment of a process for carrying out the present invention.

Referring now to the drawing, a feed material comprising, for example a kerosene, heavy naphtha, or other high boiling hydrocarbon mixture is passed via conduit 10, heater 11, and conduit 12 to conduit 13. A relatively low molecular weight, highly branched hydrocarbon, for example 2,2,4-trimethylpentane, or other light alkylate is also introduced to conduit 13 via conduit 14. The combined streams in conduit 13 are passed to heater 15 wherein the materials are vaporized and passed to adsorber 16 containing therein a molecular sieve 17 comprising, for example, chabasite. The effluent from adsorber 16 is removed via conduit 18, cooled and condensed in heat exchanger 19 and passed to fractionator 20 where substantially normal paraffin-free product is removed as product via conduits 21 and 22. The relatively low molecular weight, highly branched material is removed from fractionator 20 via conduit 23 and is recycled to conduit 13 for reuse in the system.

When the molecular sieve in adsorber 16 becomes saturated with normal paraffins, as indicated by detection of the presence of normal paraffins in line 18 by known means, such as an infrared analyzer (not shown), the flow of feed material via conduit 10 and low boiling light alkylate via conduit 14 is terminated and normal pentane, or other low boiling normal paraffin hydrocarbon, is introduced to conduit 13 via conduit 24 and is passed through the molecular sieve 17 in adsorber 16 to desorb and remove normal paraffins adsorbed from the feed material. The effluent from adsorber 16 is passed to fractionator 20 as before and substantially pure normal paraffin product is removed via conduits 21 and 25. Normal pentane is recovered overhead as a vapor and is passed via conduit 26 to conduit 13 and is recycled to the process during the desorption step. When the molecular sieve 17 has been desorbed of high boiling normal paraffins, the adsorption cycle is started again.

As an aid in a clear understanding of the invention, a specific embodiment of the invention is described. It is to be understood that the invention is not to be construed as limited by the specific embodiment.

A heavy Michigan naphtha having an ASTM boiling range of about 338 to 589° F. and containing about 36.3 volume percent n-paraffins, is charged to an adsorption column containing a molecular sieve comprising synthetic magnesium alumino-silicate prepared according to the procedure disclosed in copending application Serial No. 586,910, filed May 24, 1956 by G. C. Ray, and having pores of about 5 Angstroms, at the rate of about 0.5 volume per volume of sieve per hour along with a similar volume of 2,2,4-trimethylpentane so that the total feed is about 1 volume of feed per volume of sieve per hour. The total feed is preheated to about 475° F. to insure contacting the sieve with vaporized feed stock. After the desired adsorption time of about 1 hour, as determined by the n-paraffin content of the adsorption column effluent by infrared analysis, the feed to the adsorption column is terminated. The effluent from the adsorption column, at this point contains approximately 0.5 volume of 2,2,4-trimethylpentane, 0.005 volume of n-paraffin, and 0.31 volume of non-n-paraffin materials of higher boiling point than 2,2,4-trimethylpentane. The removal of n-paraffin from the naphtha is about 95 volume percent. The adsorption column effluent is passed to a partial condenser to remove 2,2,4-trimethylpentane.

The n-paraffins, which have been adsorbed on the sieve, are removed by displacement with n-pentane. The n-paraffins recovered can be utilized as high purity n-paraffin hydrocarbon products.

The invention has been illustrated as applicable to the separation of n-paraffins from non-n-paraffin hydrocarbons; however, the invention is applicable for use in other separations wherein molecular sieves can be utilized. The molecular sieves are effective in selectively adsorbing organic compounds and substituted organic compounds in general according to molecular configuration. Thus, these sieves are effective in adsorption of n-butyl alcohol from isobutyl alcohol, n-butyl chloride from isobutyl chloride, etc.

The low boiling, branched chain hydrocarbons which are particularly applicable for use in the invention include those isoparaffins constituting light alkylate such as 2,2,4-trimethylpentane; 2,2-dimethylbutane; 2,3-dimethylbutane; 2,2,3-trimethylbutane; etc.; and other branched chain hydrocarbons boiling in the gasoline range such as isobutane, isopentane, isohexanes, isoheptanes, and isooctanes.

The n-paraffin-containing hydrocarbon fractions which can advantageously be treated for removal of n-paraffins include naphthas, kerosene and light gas oil fractions.

Reasonable variations and modifications are possible within the scope of the disclosure of the present invention, the essence of which is the discovery high boiling, straight chain organic compounds can be selectively adsorbed by a molecular sieve by admixing with same a low boiling branched chain organic compound in an amount sufficient to lower the dew point of the mixture to below about 550° F. and contacting the molecular sieve with the resulting vaporized mixture.

That which is claimed is:

1. A method of removing straight-chain organic compounds from admixture with non-straight-chain organic compounds wherein said mixture has a dew point temperature above about 550° F., which comprises adding thereto a sufficient amount of a normally liquid, non-straight-chain organic compound having a dew point temperature below about 550° F. so that the resulting total mixture has a dew point temperature below about 550° F.; and contacting the resulting total vaporized mixture at a temperature below about 550° F. with a sufficient amount of a zeolitic molecular sieve to adsorb said straight-chain organic compound.

2. The method of claim 1 wherein the zeolitic molecular sieve is a natural zeolite.

3. The method of claim 1 wherein the zeolitic molecular sieve is a synthetic zeolite.

4. A method for de-normalparaffinizing a hydrocarbon fraction containing normal paraffins and having a dew point temperature above about 550° F. which comprises admixing same with a liquid isoparaffinic hydrocarbon having a dew point temperature below about 550° F. in an amount sufficient to reduce the dew point temperature of the resulting mixture to below about 550° F.; vaporizing the resulting mixture; and contacting the vapors with a sufficient volume of a zeolitic molecular sieve to adsorb said normal paraffins, at a temperature below about 550° F.

5. A method for de-normalparaffinizing a hydrocarbon fraction containing normal paraffins and boiling in the heavy naphtha and kerosene range which comprises admixing with same a sufficient amount of light alkylate to reduce the dew point temperature of the mixture to below about 550° F.; and contacting the mixture at a temperature above the dew point temperature and below about 550° F. with a sufficient amount of a molecular sieve comprising a zeolite to adsorb said normal paraffin.

6. The method of claim 5 wherein the normal paraffin containing hydrocarbon is a heavy naphtha and the light alkylate is 2,2,4-trimethylpentane.

7. The method of claim 5 wherein the normal paraffin containing hydrocarbon is kerosene and the light alkylate is 2,2,4-trimethylpentane.

8. The method of claim 5 wherein the light alkylate is 2,2,4-trimethylpentane.

9. The method of claim 5 wherein the light alkylate is 2,2-dimethylbutane.

10. The method of claim 5 wherein the light alkylate is 2,3-dimethylbutane.

11. In a method for removing straight-chain organic compounds from admixture with non-straight-chain organic compounds by contacting said mixture with a zeolitic molecular sieve wherein said mixture has a dew point temperature sufficiently high that said sieve catalyzes decomposition of said mixture at a temperature above the dew point of said mixture, the improvement which comprises adding to said mixture a sufficient amount of a liquid, non-straight-chain organic compound having a dew point temperature lower than that of said mixture so that the resulting total mixture has a dew point temperature below the temperature at which the sieve catalyzes decomposition of the mixture; and contacting the resulting total mixture, as a vapor, at a temperature below the temperature at which said sieve catalyzes decomposition of the mixture with a sufficient amount of said sieve to adsorb said straight-chain organic compound.

12. A method for removing normal paraffins from a hydrocarbon fraction containing normal paraffins and boiling in the heavy naphtha and kerosene range which comprises admixing with same a substantially equal amount of 2,2,4-trimethylpentane; heating the resulting mixture to a temperature of about 475° F. to vaporize said mixture; and contacting the vaporized mixture at a temperature of about 475° F. with a sufficient amount of a molecular sieve comprising a zeolite to adsorb said normal paraffin.

13. In the process of removing straight-chain organic compounds from admixture with non-straight-chain organic compounds by contacting said mixture with a zeolitic molecular sieve wherein said mixture has a dew point temperature sufficiently high that said sieve catalyzes decomposition of said mixture at a temperature above the dew point of said mixture, the improvement which comprises adding to said mixture a sufficient amount of a liquid non-straight-chain hydrocarbon having a dew point temperature lower than that of said mixture so that the resulting total mixture has a dew point temperature below the temperature at which the sieve catalyzes decomposition of the mixture; contacting the resulting total mixture, as a vapor, at a temperature below the temperature at which said sieve catalyzes decomposition of the mixture with a sufficient amount of said sieve to adsorb said straight-chain organic compound; and recovering said straight-chain organic compound by displacing same from said sieve with a lower molecular weight straight-chain organic compound.

References Cited in the file of this patent
UNITED STATES PATENTS

| | | |
|---|---|---|
| 2,134,824 | Hiatt | Nov. 1, 1938 |
| 2,804,433 | Hervert et al. | Aug. 27, 1957 |
| 2,818,137 | Richmond et al. | Dec. 31, 1957 |
| 2,880,254 | Thompson | Mar. 31, 1959 |